Figure 1:
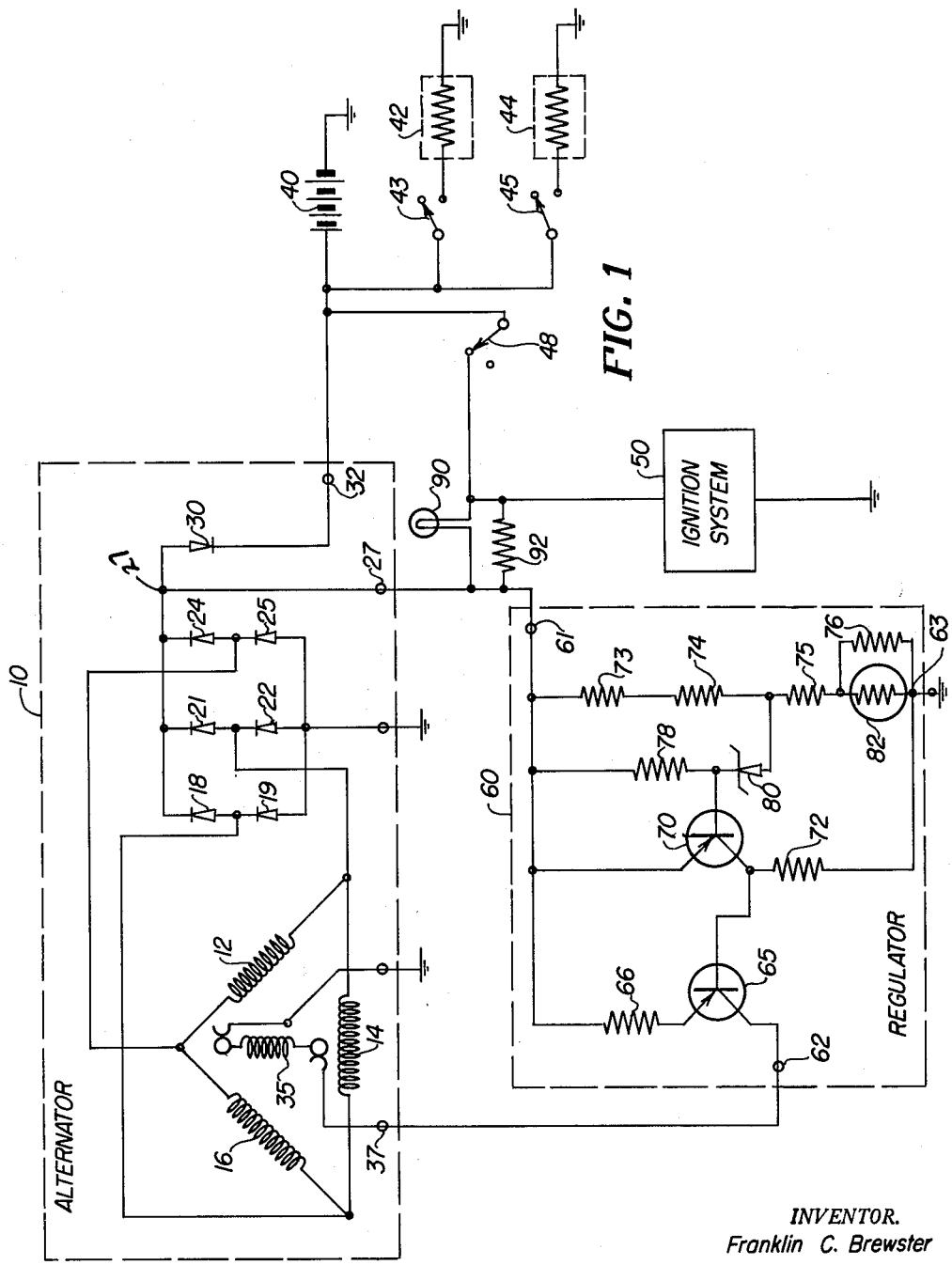

June 23, 1964

F. C. BREWSTER 3,138,751

VEHICULAR ALTERNATOR SYSTEM WITH A VOLTAGE
REGULATED BATTERY CHARGING CIRCUIT

Filed June 27, 1961

INVENTOR.
Franklin C. Brewster

BY Mueller & Aichele

Attys.

INVENTOR.
Franklin C. Brewster

BY *Mueller & Aichele*

Attys.

United States Patent Office 3,138,751
Patented June 23, 1964

3,138,751
VEHICULAR ALTERNATOR SYSTEM WITH A VOLTAGE REGULATED BATTERY CHARGING CIRCUIT
Franklin C. Brewster, Franklin Park, Ill., assignor to Motorola, Inc., Chicago, Ill., a corporation of Illinois
Filed June 27, 1961, Ser. No. 119,947
7 Claims. (Cl. 320—68)

This invention relates to a vehicular electrical system and more particularly to such a system which incorporates an alternator with a voltage regulated battery charging circuit.

Many present day vehicles such as automobiles use a generator to charge a battery for the electrical system and a warning light which is visible on the dashboard to indicate when the battery is not being charged by the generator. While it is recognized that the substitution of an alternator for the usual generator can offer advantages in an automobile, when an alternator plus suitable associated rectifiers to produce direct current are used in place of the automotive generator with its commutator and brushes, such a system may present difficulties in maintaining desirable features of low cost, good reliability and proper regulation of power output.

For example, it may be necessary to supply separate field excitation from the battery in order to initially develop alternator output. This can be due to the fact that the alternator field should have low magnetic retentivity in order to permit desirable regulation of output current, particularly at high alternator drive speeds. While it might be considered that such initial field excitation could be provided by a normal ignition switch in the vehicle, the making and breaking of an inductive alternator field circuit can present difficulties with arcing and burning of the switch contacts. In addition to deterioration of the switch contacts, the voltage regulation of the system can also be adversely affected if the regulator voltage is sensed across the circuit including defective switch contacts.

It should also be recognized that in the case of an alternator very little field current is necessary at high rotational speeds, in order to produce proper battery charging power. Therefore, it may be advantageous to utilize a regulator of a type to insure that the alternator output can be sufficiently reduced by the control of its field current at high driving speeds of the alternator. On the other hand, in order to take best advantage of the alternator output capabilities at low driving speeds, it will be highly desirable to insure that the alternator can produce a maximum output when the electrical system is heavily loaded.

Another consideration in vehicular electrical systems using an alternator concerns the use of a battery charging indicator, such as a light bulb, which is energized when the circuit is turned on and the battery is not being charged, and which is extinguished when the battery is being charged. Generally, the known circuits for a charging indicator light as used with a generator may, when incorporated into an alternator supplied electrical system, result in undesirable power losses in the system or else add additional circuit components and complexity to the system.

Accordingly, it is an object of this invention to increase the life of the electrical components in a simple vehicular electrical system utilizing an alternator, a regulator and an isolation diode.

Another object is to reduce transients and undesired power losses in such an electrical system.

A further object is to improve the voltage regulation of a battery charging electrical system and provide higher regulated output power therefrom.

A feature of the invention is the provision of a semiconductor isolation diode in a battery charging circuit incorporating an alternator and power rectifiers and further including a voltage regulator for the alternator field winding which senses the alternator output voltage, excluding the voltage drop across the isolation diode, to give improved regulation at varying alternator loads.

Another feature is the provision of the system described in the preceding paragraph in which a resistance, such as that of a charging indicator, is connected across the isolation diode through a switch, so that the switch can complete a circuit through the resistance and the voltage regulator to supply initial field current for the alternator. Furthermore, the switch may be used to apply battery current to some other portion of the electrical system such as the engine ignition system.

Figure 2:
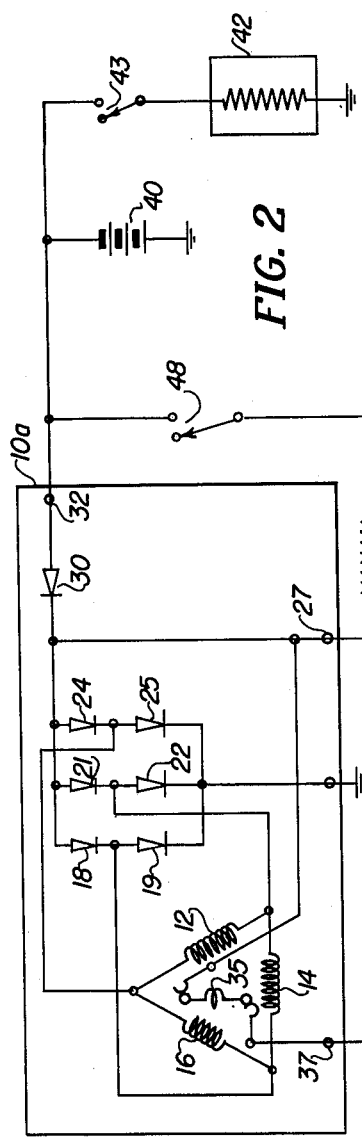
Figure 3:
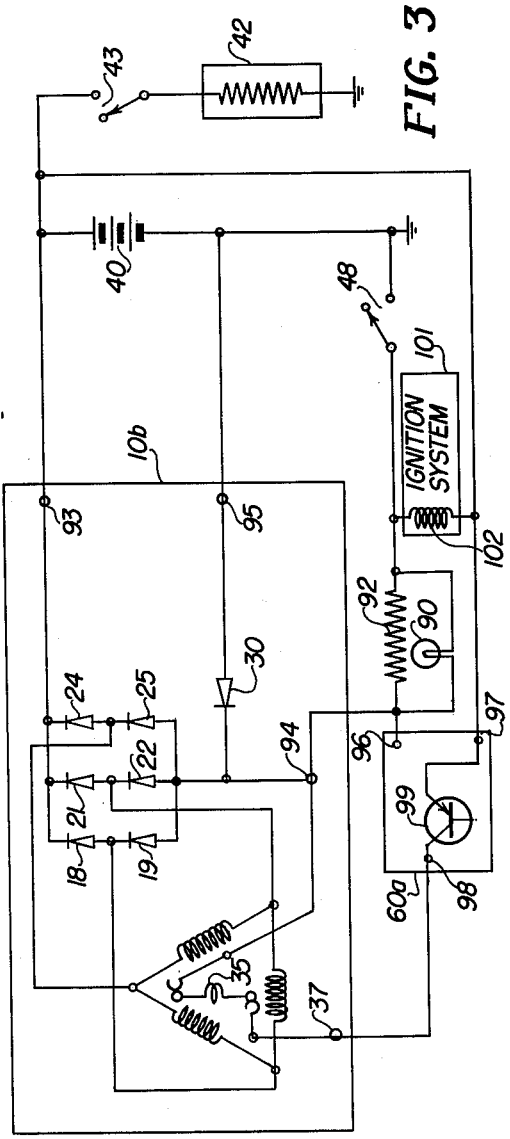

In the drawings:
FIG. 1 is a schematic diagram of a vehicular electrical system incorporating the invention;
FIG. 2 is a system comparable to that of FIG. 1 but with the battery polarity reversed with respect to ground; and
FIG. 3 is a vehicular electrical system showing a still further modification of the invention.

In a specific form, the invention is utilized with an alternator together with associated rectifiers to provide a direct current output. A battery charging circuit is connected to the alternator and this circuit includes an isolation diode poled to conduct charging current from the alternator to the battery. A resistance and a switch, such as an ignition switch of the vehicle, are series connected across the diode. The switch may be connected to the battery to also supply current to the ignition system. A voltage regulator is connected to the interconnection of the alternator direct current output and the isolation diode. The regulator is connected in circuit with a field winding of the alternator to regulate the alternator output. Starting current for the alternator field winding is thus supplied from the battery through the switch and the resistance to the regulator. This current is also sufficient to energize an indicator bulb, which in itself can form the resistance or can be connected across a resistor. The bulb will be extinguished when the output of the generator is sufficient to cause conduction of the diode and charging of the battery. Since there is a substantially fixed voltage drop across the diode, the voltage regulator may be compensated for this voltage drop in the regulation of the battery charging voltage, while at the same time, particularly for heavy charging loads, the field winding may be energized by the regulator from a voltage which is the full battery terminal voltage plus the diode voltage drop.

In FIG. 1 the alternator 10, which may be driven from the engine of a vehicle in which the electrical system is incorporated, includes armature windings 12, 14 and 16 connected in delta. As an alternative a wye connection could also be used. The corners of the delta are connected to the respective interconnections of the power rectifier pairs 18, 19 and 21, 22 and 24, 25. The equivalent of the anodes of the rectifiers 19, 22 and 25 are all interconnected to the frame of the alternator or a reference ground. The equivalent of the cathodes of rectifiers 18, 21 and 24 are interconnected to an intermediate output terminal 27 of the alternator. A direct current voltage, positive with respect to the reference point, appears at terminal 27 in response to full wave rectification of the three phase output of the armature windings 12, 14 and 16 and the bank of rectifiers.

An isolation diode 30, preferably included with rectifiers 18, 19, 21, 22, and 24, 25 as a structural part of the alternator 10, is connected between the output terminal 27 and the further output terminal 32. The rectifier 30 is poled to provide conduction from the alternator to the output terminal 32. A field winding 35 of the alternator is connected through the usual slip rings and brushes to the ground conductor or reference frame of the alternator, and to a field current supply terminal 37.

A storage battery 40, providing for example 12 volts, is connected between the output terminal 32 of the alternator and the reference point of the electrical system. Various items of electrical equipment are shown representatively connected to the battery 40. These include an electrical load 42 series connected with a control switch 43 across the battery 40 and an electrical load 44 series connected with switch 45 across the battery 40. The electrical loads 42, 44 could represent such items as a starter for the vehicle, lights for the vehicle, a radio for the vehicle, or any other piece of electrical equipment.

An ignition switch 48 includes a movable contact connected to the positive terminal of battery 40 and a fixed contact connected to the ignition circuit 50 for an internal combustion engine of the vehicle.

While various types of voltage regulators can be utilized in the system, a transistorized regulator may be advantageous from the standpoint of improved control and reliability. The transistorized voltage regulator 60 has an input terminal 61 connected to the intermediate terminal 27 of the alternator 10. The regulator further includes a field current supply terminal 62 connected to terminal 37 of the alternator. Regulator 60 is connected to ground, or the reference point for the electrical system, through a suitable reference conductor 63.

It may be seen that the PNP power transistor 65 of the regulator 60 has a collector electrode connected to terminal 62 and an emitter electrode connected through a bias resistor 66 to the terminal 61. Accordingly, the emitter-collector current path of transistor 65 conducts current from the intermediate output terminal 27 of the alternator to the field winding 35 of the alternator.

The current or potential for the base electrode of transistor 65 is varied in accordance with the output voltage of the alternator 10 at its terminal 27 in order to control the current in field winding 35 for regulating the alternator output to a substantially constant voltage. A base control circuit for transistor 65 is established by the emitter-collector electrode current path of PNP control transistor 70 and the resistor 72 which are connected in series between terminal 61 and the reference point 63. The junction of the collector of transistor 70 and the resistor 72 is connected to the base of transistor 65.

A voltage divider including resistors 73, 74, 75 and 76 are series connected between terminal 61 and terminal 63. A further resistor 78 is series connected with the zener diode 80 between the terminal 61 and the junction of resistors 74 and 75. The junction of resistor 78 and diode 80 is connected with the base electrode of transistor 70. The voltage divider 73–76 will thus establish a potential on the diode 80 so that it can conduct in a reverse direction when a given voltage exists across the terminals 61 and 63 of the voltage regulator. Once the diode 80 is in reverse conduction there will be a constant potential established at the base of transistor 70 so that any voltage variation at the terminal 61 will be reflected as a potential change at the emitter electrode of transistor 70.

Accordingly, as the potential of the alternator at intermediate terminal 27 increases above the predetermined value at which the bias circuit for the base of transistor 70 has been designed, diode 80 will conduct to establish a fixed potential at the base electrode of transistor 70, and its emitter potential will increase to cause increased conduction through the emitter to collector path of transistor 70. Correspondingly, the potential of the base electrode of transistor 65 will be established at a more positive potential to reduce the emitter-collector conduction therein and thus reduce the current supplied to the rotating field winding 35 of the alternator. With reduced field current, the output potential of the alternator will decrease so that the potential on regulator terminal 61 is low enough to cause cutoff of diode 80 and a resultant decrease in conduction of transistor 70 so that the conduction of transistor 65 is increased. This will bring about an increased current applied to the field winding 35 causing the voltage output of the alternator to again increase. Such cycling of the alternator output potential above and below the established regulation point of the regulator 60 will continue at a faster or slower rate depending upon the speed at which the alternator turns and its output voltage, in order to average the current through the field winding 35 to provide a regulated potential from the alternator.

A temperature dependent resistor 82 is connected across the resistor 76 in the voltage divider 73–76 to temperature compensate the regulator 60. It is preferable that the value of resistor 82 vary with ambient temperature in a manner to effectively "track" the potential requirements of the storage battery 40 at different temperatures. Thus, for example, if the battery 40 is of the lead-acid type such that it will require a higher charging potential at low ambient temperatures, then the resistor 82 should change in value at such low temperatures to cause an increase in the value of the output potential of the alternator at which the regulator establishes such output.

An indicator light 90, sometimes referred to as a "No Charge" or "tell-tale" light, is connected between the intermediate alternator terminal 27 and the fixed terminal of the ignition switch 48. This lamp is shunted by a resistor 92. It is the purpose of light 90 to indicate whether or not the alternator is properly charging the battery. When the ignition switch 48 is first closed, the light 90 will be energized by the battery through a current path including resistor 66, the emitter and collector of transistor 65 and the field winding 35. This will indicate that the alternator is not charging the battery. However, after the engine of the vehicle has been started and the alternator is developing a potential at terminal 27 which exceeds the reverse bias of diode 30 by battery 40, the diode 30 will be conductive and the lamp 90 will be extinguished. It can be seen that the lamp 90 is series connected with ignition switch 48 across the diode 30. However, the voltage drop across diode 30, throughout the range of possible power drain from the alternator, will be of the order of one volt and this will be insufficient to cause the lamp 90 to be energized. Accordingly, with the ignition switch 48 closed, the lamp 90 will be off if the battery is being charged and diode 30 is conductive, and will be on if the diode 30 is not conductive.

Since the regulator 60 is connected to intermediate terminal 27 of the alternator, the potential which is applied to the regulator will exclude the voltage drop across diode 30. Diode 30 may be of the silicon type which can be shown to have a voltage drop of approximately .8–1.2 volts throughout a fully practical range of current and a useful range of ambient temperature variation. Accordingly, it is preferable to adjust the regulator 60 to provide the desired battery charging voltage at output terminal 32 when the potential at intermediate terminal 27 is approximately 1 volt higher than that desired, for charging battery 40. The voltage drop across diode 30 is thus a relative constant which can be anticipated in the setting of regulator 60.

This feature of the system is to be contrasted to a system in which the regulator 60 might be connected through the ignition switch to the alternator field, the purpose of the switch being to prevent current flow through the regulator and alternator field winding when the system is turned off. In such a case, variation in the condition of the switch contacts would introduce an unknown variable voltage drop necessitating readjustment of the regulator for proper compensation. Furthermore, since the regulator 60 is connected to intermediate terminal 27 which excludes the voltage drop across diode 30, a higher voltage is available for energizing the field winding 35 when the alternator is called upon to provide its maximum output, particularly when the battery 40 is partially discharged or the electrical load at terminal 32 is very heavy.

Since it is contemplated that the alternator 10 will be turned at various speeds dependent upon the engine speed of the vehicle, it is desirable that the magnetic retentivity of the magnetic structure of the alternator be virtually zero so that at high alternator speeds the voltage output can be sufficiently reduced by reduction of the current in field winding 35. This means that the field current for winding 35 must be supplied externally in order to initially obtain an output from the alternator when it is first started up. In the past, it has been known to utilize a switch such as switch 48 to connect the field winding to the battery for initially supplying field current. However, this presents an undesirable current drain of field current on the battery at a time when maximum current is needed for starting. Furthermore it may cause deterioration of the switch contacts by arcing produced through the making and breaking of an inductive circuit. In the present system, when the switch 48 is closed, the current path for energization of the light bulb 90 will be established through the field winding 35 and this can be, e.g., of the order of one-fourth ampere to energize lamp 90 and at the same time provide a small field current until the alternator is turning enough to develop a field energizing potential at intermediate terminal 27 for its own field excitation. Resistor 92 shunted across bulb 90 could be omitted but it may be desirable to permit initial energization of the field winding from the battery in case the light bulb 90 should burn out.

The system can also be used with lamp 90 omitted so that resistor 92 by itself supplies the initial field current. This arrangement may be especially desirable in a system incorporating an ammeter to indicate battery charging rather than a light bulb indicator such as lamp 90. The circuit of FIG. 2 shows the lamp bulb 90 omitted for illustrative purposes, although it will be understood that the lamp bulb 90 could be incorporated into this circuit of FIG. 2, or the lamp bulb 90 could be omitted from the circuit of FIG. 1.

FIG. 2 illustrates the system of FIG. 1 as it may be constructed to be used with a storage battery which has its positive terminal connected to ground or the reference point. Components corresponding to those of the system of FIG. 1 are given the same reference identification numerals.

In FIG. 2 the isolation diode 30 is reversed in polarity (over FIG. 1) as it is connected between terminals 27 and 32 of the modified alternator 10a. The rectifier diodes of the alternator 10a, namely rectifiers 18, 19; 21, 22; and 24, 25, are each reversed in polarity. Accordingly, the electrodes corresponding to the cathodes of the rectifiers 19, 22 and 25 are connected to the reference point or ground. Furthermore, the electrodes corresponding to the anodes of rectifiers 18, 21 and 24 are connected to terminal 27. With this arrangement the alternator 10a will produce a potential at terminals 27 and 32 which is negative with respect to ground or the reference point in order to charge the battery 40.

The voltage regulator 60 for the system of FIG. 2 may correspond to the regulator 60 of FIG. 1. However, the connection in FIG. 2 differs in that terminal 61 would be connected to ground which is connected to the positive terminal battery 40, and terminal 63 of the regulator 60 would be connected to the terminal 27 of the alternator. As in the circuit of FIG. 1, the field winding terminal 37 of the alternator is connected to the terminal 62 of the regulator 60. However, the remaining terminal of the field winding 35 is connected through its slip ring and brush to terminal 27 of the alternator 10a. The path for the current of field winding 35 is from the output terminal 27 of the alternator and through the regulator back to the conductive frame of the alternator 10a which will be positive with respect to the terminal 27. Therefore, the regulator 60 may function in the same manner as that described in FIG. 1 and the potentials existing in the regulator 60 will be the same as previously described so that the transistors will be properly energized.

The system of FIG. 3 is similar to the system of FIG. 1 except that the alternator 10b is not connected directly to the reference ground and the isolation diode 30 is connected in series with the negative charging lead for the battery 40 rather than the positive charging lead.

In FIG. 3 the electrodes corresponding to the cathodes of the rectifiers 18, 21 and 24 are connected to the terminal 93 of the alternator 10b which is connected to the positive terminal of the battery 40. The electrodes corresponding to the anodes of rectifiers 19, 22 and 25 are connected to the intermediate terminal 94. The isolation diode 30 is connected between terminal 94 and terminal 95 of the alternator. Terminal 95 is connected to the negative pole of battery 40 and this is established at ground or the system reference potential. Therefore, the battery charging circuit is completed through the isolation diode 30 so that charging will take place when the output potential of the alternator 10b at terminals 93, 95 exceeds the potential of the battery 40 so that conduction of diode 30 can take place.

The regulator 60a has a terminal 96 connected to terminal 94 of the alternator and a terminal 97 connected to terminal 93. The field terminal 98 of the regulator 60a is connected to field terminal 37 of the alternator 10b. It will be understood that the regulator 60a must be modified somewhat over the circuit shown in FIG. 1 for the regulator 60 since the potential changes which are to be regulated against are negative potentials sensed at terminal 94 of the alternator. It will be necessary to control the conduction of the base electrode of transistor 99 with respect to potential variations at terminal 94 to effect the desired regulation. Regulator 60a may be set to regulate at a potential which equals the sum of the potential of battery 40 and the voltage drop across diode 30 just as is the case with the system of FIG. 1.

In FIG. 3 when the switch 48 is closed, and during starting of the motor of the vehicle in which the electrical system is used, initial current for field winding 35 is supplied from the battery 40 through the switch 48, the parallel combination of indicator lamp 90 and resistor 92, through the field winding 35 one end of which is connected to terminal 94, and the collector-emitter path of transistor 99 to the positive terminal of the battery 40. As previously explained, this current will cause energization of the charge indicating lamp 90 and initial field energization for the alternator. Once the alternator has come up to speed so that diode 30 is conducting and the battery is being charged, the lamp 90 will be extinguished and the current for field winding 35 will, of course, be supplied through the path of the regulator transistor 99 from the potential produced across terminals 93, 94 of the alternator 10b.

The system of FIG. 3 may find use in an electrical system utilizing an ignition circuit 101 having a magneto winding 102 energized by the battery 40 through the switch 48. Magneto winding 102 is representative of a part of a complete magneto which may be used to supply a high voltage for the spark plugs of the ignition system 101. A system of this type is sometimes incorporated in aircraft.

It is an advantage of the circuits hereof to have the alternator field current supplied by the alternator itself and not by the battery, except for a very small initial current through the resistor 92 and/or lamp 90, the alternator field can collapse slowly as the machine slows down and there need be no sudden interruption of the field current to create a surge voltage in the system. This is due to the isolation provided by the diode 30 and it is to be contrasted to a system in which a relatively large field winding current is supplied through a switch or relay from the battery. In the described system the indicator light 90, which serves the dual function of indicating whether the battery is being charged and conducting the initial field winding starting current for the alternator, is incorporated into the circuit in a very simple and inexpensive manner. In the past it has sometimes been necessary to include one or more resistors, which cause undesired power losses, or to include a separate relay, with the attendant reliability problem, for the purpose of properly operating such an indicator lamp. In the present system, it is only necessary to incorporate an isolation diode 30 and an indicator lamp 90 in order to provide a system for full visual charging indication as well as permitting the reduction of power losses and transients in the system and giving increased component life and improved voltage regulation characteristics for the alternator with its associated regulator.

I claim:

1. A vehicular electrical system including in combination, an alternator having armature winding means and field winding means, first and second output conductors, rectifier means connecting said armature winding means to said output conductors, a battery charging circuit connected to said output conductors including a diode connected to said first output conductor and means for connection to a battery series connected between said diode and said second output conductor, a voltage regulator connected between said output conductors for sensing the voltage therebetween, said voltage regulator having current conducting means connected in series with said field winding means between said output conductors, said diode being non-conductive when the voltage between said output conductors falls below a given value, switch means and resistance means connected in series across said diode, said switch means completing a circuit through said resistance means for initially conducting battery current to said first output conductor, with such current being applied to said field winding means through said current conducting means of said regulator, said alternator when operating providing current through said rectifier means to said output conductors and through said current conducting means of said regulator to said field winding means for energizing the same.

2. A vehicular electrical system for an automobile including in combination, an alternator having a plurality of armature windings and a field winding, an output conductor, a plurality of rectifiers connecting said armature windings to said output conductor to provide direct current at said output conductor with respect to a reference point for the system, said alternator having a magnetic structure of such magnetic retentivity to require separate excitation of said field winding upon initial operation thereof, an isolation diode, a storage battery series connected with said isolation diode between said output conductor and the reference point, said diode being poled to be non-conductive when the voltage between said output conductor and the reference point is less than the voltage of said battery, a voltage regulator having input connections connected between said output conductor and the reference point, said voltage regulator further having a field terminal and a conductive path between said output conductor and said field terminal, means connecting said field winding between said field terminal and the reference point, switch means and an indicator lamp connected in series across said isolation diode with said switch means being connected between said battery and said indicator lamp, and an ignition system for the vehicle connected between said switch means and the reference point to be energized by said battery through said switch means, whereby energizing current for said field winding of said alternator is provided from said battery through said indicator lamp and said current path of said regulator with said switch means closed, and said alternator when operating providing current through said rectifiers to said output conductor and through said conductive path of said regulator to said field winding means for energizing the same.

3. In a vehicular electrical system including a battery and an alternator unit with field means and rectifier means to provide direct current for charging the battery, a regulator system including in combination, a voltage regulator coupled to the alternator unit and connected to the field means thereof and having an input terminal and circuit means providing a direct current path from said input terminal to the field means, voltage responsive switching means connected between the battery and said input terminal and coupled to the alternator unit, said switching means being responsive to a given voltage of the alternator unit to become conductive and further responsive to reduced voltage of the alternator unit to open circuit the conductive path from the battery to said input terminal and through said regulator to the field means thereby reducing battery drain through said regulator and the field means, a manually operable switch, and resistor means connected in a series circuit with said manually operable switch across said switching means whereby direct current from the battery is conducted through said manually operable switch, said resistor means and said direct current path of said regulator to provide initial excitation of said field means, the alternator unit when operating providing energizing current to the field means thereof through the rectifier means and said direct current path of said regulator.

4. In a vehicular electrical system including a battery, an alternator unit with a field winding and rectifier means to provide direct current for charging the battery, a regulator and indicator system including in combination, a voltage regulator connected to the field winding and having an input terminal and a circuit providing a direct current path from said input terminal to the field winding, voltage responsive switching means connected between the battery and said input terminal and coupled to the alternator unit, said switching means being responsive to a given voltage of the alternator unit to become conductive and further responsive to reduced voltage of the alternator unit to open circuit the conductive path from the battery to said input terminal and through said regulator to the field winding thereby preventing battery drain through said regulator and the field winding, a manually operable ignition switch, an indicator lamp connected in a series circuit with said ignition switch across said switching means, a resistor and means connecting the same across said lamp, whereby direct current from the battery is conducted through said ignition switch and through said lamp and resistor in parallel to said input terminal and through said regulator to provide initial excitation of said field winding means from the battery and said lamp is lighted upon open circuiting of said switching means to indicate non-charge of the battery.

5. In a vehicular electrical system including a battery, an ignition system, a switch connecting the ignition system to the battery, and an alternator unit with field means and rectifier means to provide direct current between first and second terminals, and wherein the alternator unit has a magnetic structure of such magnetic retentivity to require initial energization of the field means for operation of the alternator unit, a regulator and indicator system including in combination, means connecting the first and second terminals to the battery to provide current flow for charging the battery and including a diode connecting the first terminal to the battery, said diode being non-conductive when the voltage between said first and second terminals falls below a given value, a voltage regulator for controlling the supply of current to the field means and having conductors connected to the first and second terminals, said voltage regulator further having a field terminal and a conductive path between said conductor connected to the first terminal and said field terminal, means connecting the field means between said field terminal and the second terminal, and indicator means having a resistive path connected between the switch and the first terminal, said indicator means and the switch being connected in series across said diode so that a conductive path is provided from the battery through the switch and said resistive path of said indicator means to the first terminal and through said conductive path of said regulator to the field means of the alternator for providing initial energizing current therefor, with said initial current actuating said indicator means, the alternator unit when operating providing current through said rectifier means to said first terminal and through said conductive path of said regulator to the field means for energizing the same, and providing a voltage between said first and second terminals to cause said diode to conduct and bridge said indicator means to de-actuate the same.

6. In a vehicular electrical system including a battery and an alternator unit with field means and rectifier means to provide direct current for charging the battery, the combination of, a voltage regulator connected to the field means for controlling the supply of current thereto and having an input terminal and circuit means providing a direct current path from said input terminal to the field means, a manually operatble switch, resistor means connected in series with said manually operable switch from the battery to said input terminal whereby direct current from the battery is conducted through said switch and said resistor means and said direct current path of said voltage regulator to provide initial excitation current to the field means of the alternator unit, and voltage responsive switching means coupled to the alternator unit and connected in shunt with said manually operable switch and said resistor means, said voltage responsive switching means being responsive to a voltage of the alternator unit which is above a given level for conducting current from the alternator unit, and said voltage responsive switching means further being responsive to a voltage of the alternator unit which is below the given level to open circuit and prevent current flow therethrough from the battery through said voltage regulator to the field means.

7. In a vehicular electrical system including a battery, an ignition system, an ignition switch for connecting the ignition system to the battery, and an alternator unit with field means and rectifier means to provide direct current for charging the battery, and wherein the alternator unit has a magnetic structure of such magnetic retentivity to require separate excitation of the field means for operation of the alternator unit, a regulator system including in combination, a voltage regulator connected to the alternator unit for controlling the supply of current to the field means and having a terminal and means providing a direct current path from said terminal to the field means, voltage responsive switching means connected between the battery and said terminal and coupled to the alternator unit, said switching means being responsive to a given voltage of the alternator unit to provide a conductive path from the battery to said terminal and further responsive to reduced voltage of the alternator unit to open circuit the conductive path from the battery to said terminal and through said direct current path of said regulator to the field means, and indicator means having a resistive path connected in a series circuit with the ignition switch across said switching means, whereby direct current from the battery is conducted through the ignition switch, said resistive path of said indicator means and said direct current path of said voltage regulator to provide initial excitation current from the battery to the field means of the alternator unit and the current through said indicator means actuates the same, the alternator unit when operating providing energizing current for the field means thereof through said direct current path of said regulator and causing said switching means to provide a conductive path in shunt with said indicator means to de-actuate the same.

References Cited in the file of this patent
UNITED STATES PATENTS

| | | |
|---|---|---|
| 2,809,301 | Short | Oct. 8, 1957 |
| 2,951,195 | Domann | Aug. 30, 1960 |
| 2,975,352 | Ford | Mar. 14, 1961 |
| 2,996,655 | Byles | Aug. 15, 1961 |
| 3,011,115 | Grady | Nov. 28, 1961 |
| 3,036,261 | Grady | May 22, 1962 |